No. 897,296. PATENTED SEPT. 1, 1908.
I. LESTER.
GATE HINGE.
APPLICATION FILED NOV. 13, 1907.
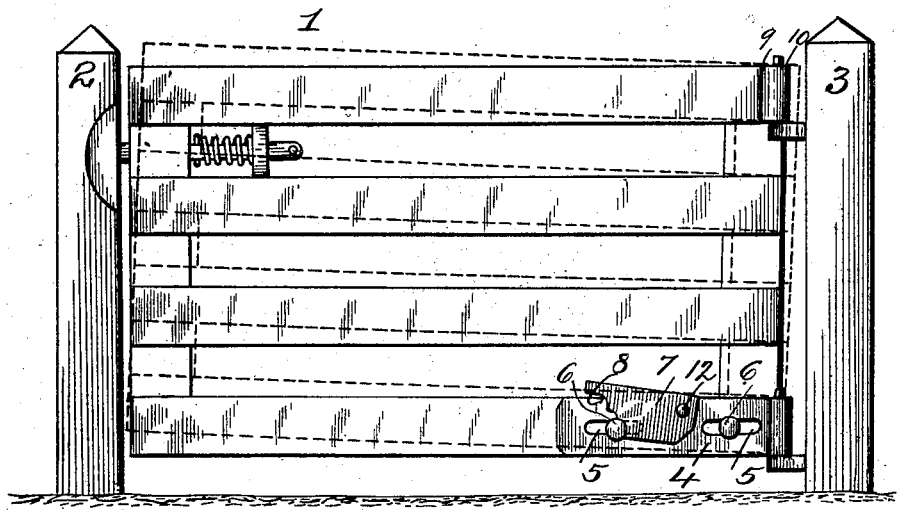
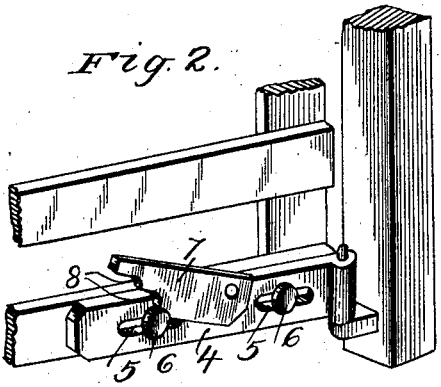
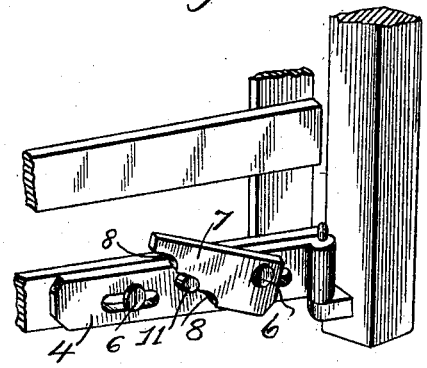
Witnesses
Inventor
Irwin Lester.
By
Attorneys

UNITED STATES PATENT OFFICE.

IRWIN LESTER, OF TUSCOLA, ILLINOIS.

GATE-HINGE.

No. 897,296.  Specification of Letters Patent.  Patented Sept. 1, 1908.

Application filed November 13, 1907. Serial No. 401,990.

*To all whom it may concern:*

Be it known that I, IRWIN LESTER, citizen of the United States, residing at Tuscola, in the county of Douglas and State of Illinois, have invented certain new and useful Improvements in Gate-Hinges, of which the following is a specification.

The present invention appertains to adjustable hinges, designed most especially for farm gates, whereby compensation for settlement may be had or which will admit of the outer or swinging end of the gate being elevated more or less to clear obstructing matter, such as ice and snow.

The present invention combines with an adjustable hinged member securing means of novel formation, the same consisting of a stepped latch and a coöperating stop, said latch being mounted either directly upon the hinge member or upon a bolt or like fastening connecting said hinged member to the gate or like part to which secured.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a gate provided with a hinge embodying the invention, the dotted lines showing an adjusted position of the gate. Fig. 2 is a detail perspective view of the hinge, and a portion of the gate and post to which the gate is attached. Fig. 3 is a view similar to Fig. 2, showing a modification, the latch being mounted upon a bolt or fastening securing the adjustable hinged member of the gate.

Corresponding and like parts are referred to in the following description and indicated in all the views of the drawings by the same reference characters.

The gate 1 may be of any design and is adapted to close the opening in an inclosure or fence and comprised between the latch or fence post 2 and hinge post 3. The gate is mounted to swing from one side only and is provided with an adjustable hinge member to compensate for sag so that the gate may be leveled from time to time, as may be required. The adjustable hinge member is by preference located at the lower corner of the gate and comprises a plate 4 having longitudinal slots 5 through which the fastenings 6 pass, said plate being confined between a side of the gate and the heads of the fastenings 6 in a manner to admit of the gate having a limited movement so that its outer or swinging end may be elevated or lowered as may be required either to level or adjust the gate to meet existing conditions. A latch 7 is pivoted to the plate 4 and is adapted to coöperate with a fastening 6 to hold the gate in the adjusted position. To prevent displacement of the latch 7, it is formed with a series of shoulders 8 having a progressive arrangement and which shoulders are adapted to engage with a fastening 6 so as to support and prevent slipping of the gate when moved to the required position. The bolt or fastening 6 with which the latch 7 engages constitutes a stop and the shoulders 8 of the latch engage said bolt to hold the hinged member 4 in the required adjusted position. The upper hinge comprising the members 9 and 10 has a limited play to provide for movements of the gate incident to the adjustments of the member 4 of the lower hinge.

In the construction shown in Fig. 3, the latch 7 is mounted upon one of the fastenings or bolts 6 and its shouldered or stepped portion 8 is adapted to engage with a stud 11 provided upon the plate or hinged member 4. In the preferred construction, the stepped or shouldered latch moves with the plate or hinged member 4, being pivoted thereto at 12, whereas in the form shown in Fig. 3, the latch 7 is pivotally mounted upon one of the fastenings 6 and does not move with the hinge 4, but is adapted to coöperate with the stop 11 carried by said hinge member. The construction of hinge set forth herein provides ready and convenient means for adjusting the gate to allow for settlement of any nature, as well as to admit of the outer or free end of the gate being moved to any elevation to clear ice, snow or other obstructing matter, or to vary the distance between the lower edge of the gate and the ground so that stock may be separated.

Having thus described the invention, what is claimed as new is:

1. In a hinge of the character specified, the combination of a support, a hinge member having adjustable connection with the said support, a stop and coöperating shouldered latch of which one is attached to the support and the other to the hinge member to secure the latter in the required adjusted position.

2. In combination, a support, a hinge member adjustably mounted upon the said support and having a slot, a fastening projected from the support and passed through the slot of the hinge member, a stop and coöperating pivoted shouldered latch of which one is attached to the support and the other to the hinge member to secure the latter in the adjusted position.

3. In a swinging gate, the combination of an adjustable hinge member, the same consisting of a plate having longitudinal slots, fastenings passed through said slots for connecting the plate to the gate, and a latch pivoted to said plate and adapted to coöperate with a fastening thereof to hold the gate in an adjusted position.

In testimony whereof I affix my signature in presence of two witnesses.

IRWIN LESTER. [L. S.]

Witnesses:
T. A. JONES,
J. R. SMITH.